United States Patent
Chang et al.

(10) Patent No.: US 10,884,601 B2
(45) Date of Patent: ***Jan. 5, 2021

(54) ANIMATING AN IMAGE TO INDICATE THAT THE IMAGE IS PANNABLE

(71) Applicant: Google LLC, Mountain View, CA (US)

(72) Inventors: William Young Chang, Renton, WA (US); Dana A. Bright, Seattle, WA (US); Thomas Homer Rutledge, San Jose, CA (US); Soufi Esmaeilzadeh, Menlo Park, CA (US); Antin Harasymiv, Palo Alto, CA (US); Su Chuin Leong, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,372

(22) Filed: May 13, 2019

(65) Prior Publication Data
US 2019/0265856 A1 Aug. 29, 2019

Related U.S. Application Data

(63) Continuation of application No. 15/248,530, filed on Aug. 26, 2016, now Pat. No. 10,289,297.

(51) Int. Cl.
*G06F 3/048* (2013.01)
*G06F 3/0485* (2013.01)
(Continued)

(52) U.S. Cl.
CPC ........ *G06F 3/0485* (2013.01); *G06F 3/04845* (2013.01); *G06F 3/04883* (2013.01); *G06T 3/20* (2013.01); *G06T 13/80* (2013.01)

(58) Field of Classification Search
CPC ..... G06F 3/0485; G06F 3/04845; G06T 3/20; G06T 13/80
See application file for complete search history.

(56) References Cited

U.S. PATENT DOCUMENTS 8,570,329 B1 * 10/2013 Ofstad .................... G06T 13/20
345/473
9,715,901 B1 * 7/2017 Singh ................. H04N 21/8456
(Continued)

FOREIGN PATENT DOCUMENTS

CN 102782633 11/2012
CN 105700812 6/2016

OTHER PUBLICATIONS

CN Office Action in Chinese Appln. No. 201780052029.6, dated Nov. 25, 2019, 18 pages (with machine translation).
(Continued)

*Primary Examiner* — Hua Lu
(74) *Attorney, Agent, or Firm* — Fish & Richardson P.C.

(57) ABSTRACT

In general, the subject matter described in this disclosure can be embodied in methods, systems, and computer-readable devices. A computing device presents a user interface that includes first and second images. The computing device receives first user input that moves the user interface in a first direction. The computing device moves the user interface in the first direction by moving the first and second images in the first direction, and modifying a presentation of the second image at the same time that the second image is moved in the first direction, to indicate that the second image is an image that is pannable. The computing device receives second user input that interacts with the second image to pan the second image. The computing device pans the second image by replacing a first portion of the second image with a second portion of the second image.

13 Claims, 6 Drawing Sheets

(51) Int. Cl.
*G06F 3/0484* (2013.01)
*G06F 3/0488* (2013.01)
*G06T 3/20* (2006.01)
*G06T 13/80* (2011.01)

(56) References Cited

U.S. PATENT DOCUMENTS

| | | | | |
|---|---|---|---|---|
| 2007/0136750 A1* | 6/2007 | Abanami | ............ | H04N 21/8583 725/44 |
| 2008/0155474 A1* | 6/2008 | Duhig | .................. | G06F 3/0482 715/830 |
| 2008/0163116 A1* | 7/2008 | Lee | ........................ | G06F 3/0481 715/815 |
| 2009/0031246 A1* | 1/2009 | Cowtan | ................... | G06Q 30/00 715/786 |
| 2010/0043028 A1* | 2/2010 | Cormican | ........ | H04N 21/26283 725/52 |
| 2011/0225492 A1* | 9/2011 | Boettcher | ........... | G06F 3/04883 715/702 |
| 2012/0011464 A1* | 1/2012 | Hayashi | ............. | H04N 1/00458 715/784 |
| 2013/0141524 A1* | 6/2013 | Karunamuni | ......... | G06T 3/4038 348/38 |
| 2014/0111594 A1* | 4/2014 | Schuh | ......................... | B41J 3/36 347/218 |
| 2014/0362274 A1* | 12/2014 | Christie | ................ | G06F 3/0485 348/333.11 |
| 2015/0029197 A1* | 1/2015 | Almosnino | ............. | G06T 13/80 345/474 |
| 2015/0095846 A1* | 4/2015 | Danton | .................. | G06F 3/0482 715/784 |
| 2015/0212702 A1 | 7/2015 | Kim et al. | | |
| 2015/0347361 A1* | 12/2015 | Circlaeys | .............. | G06F 40/131 715/234 |
| 2016/0035119 A1* | 2/2016 | Lee | ..................... | G06F 3/04883 345/473 |
| 2016/0267067 A1* | 9/2016 | Mays | ....................... | G06F 16/00 |
| 2017/0060378 A1* | 3/2017 | Hartman | ............... | G06F 3/0486 |
| 2017/0060404 A1* | 3/2017 | Salituri | ................ | G06F 3/0481 |
| 2017/0228359 A1* | 8/2017 | Cuzzort | ................ | G06F 3/1454 |
| 2018/0059896 A1 | 3/2018 | Chang et al. | | |
| 2018/0121049 A1* | 5/2018 | Park | ....................... | G06F 3/0485 |
| 2020/0241718 A1* | 7/2020 | Migos | ................. | G06F 3/04842 |

OTHER PUBLICATIONS

Awan et al., "Developing the technical language behind creativity for Canvas" Facebook Engineering, retrieved at URL <https://engineering.fb.com/android/developing-the-technical-language-behind-creativity-for-canvas/>, Jun. 17, 2016, 11 pages.
EP Extended European Search Report in European Appln. No. 17844102.8, dated Mar. 13, 2020, 10 pages.
Facebook Engineering [online], "Canvas demo," retrieved at URL <https://www.facebook.com/Engineering/videos/10154169910882200/>, Jun. 16, 2016, 8 pages.
'terrymun.github.io' [online] "Replicating the photo viewer/panner seen on the experimental Facebook Pages app," Aug. 15, 2015 [retrieved on Oct. 4, 2017] Retrieved from Internet: URL<http://terrymun.github.io/paver/demo/index.html> 13 pages.
'www.thepetedesign.com' [online] "JQuery Panorama Viewer," Mar. 5, 2016 [retrieved on Oct. 4, 2017] Retrieved From Internet: URL<http://www.thepetedesign.com/demos/panorama_viewer_demo.html> 3 pages.
Ashish, "How to Shoot and Upload Photos in 360 Degrees on Facebook Using Your Smartphone," Guiding Tech, Jul. 16, 2016 [retrieved on Aug. 26, 2016]. Retrieved from the Internet: URL<http://www.guidingtech.com/60166/360-degree-photos-facebook/>, 10 pages.
Huang, "Introducing 360 Photos on Facebook," Facebook Newsroom, Jun. 9, 2016 [retrieved on Aug. 26, 2016]. Retrieved from the Internet: URL<http://newsroom.fb.com/news/2016/06/introducing-360-photos-on-facebook/>, 4 pages.
International Search Report and Written Opinion in International Application No. PCT/US2017/045062, dated Oct. 2, 2017, 8 pages.

\* cited by examiner

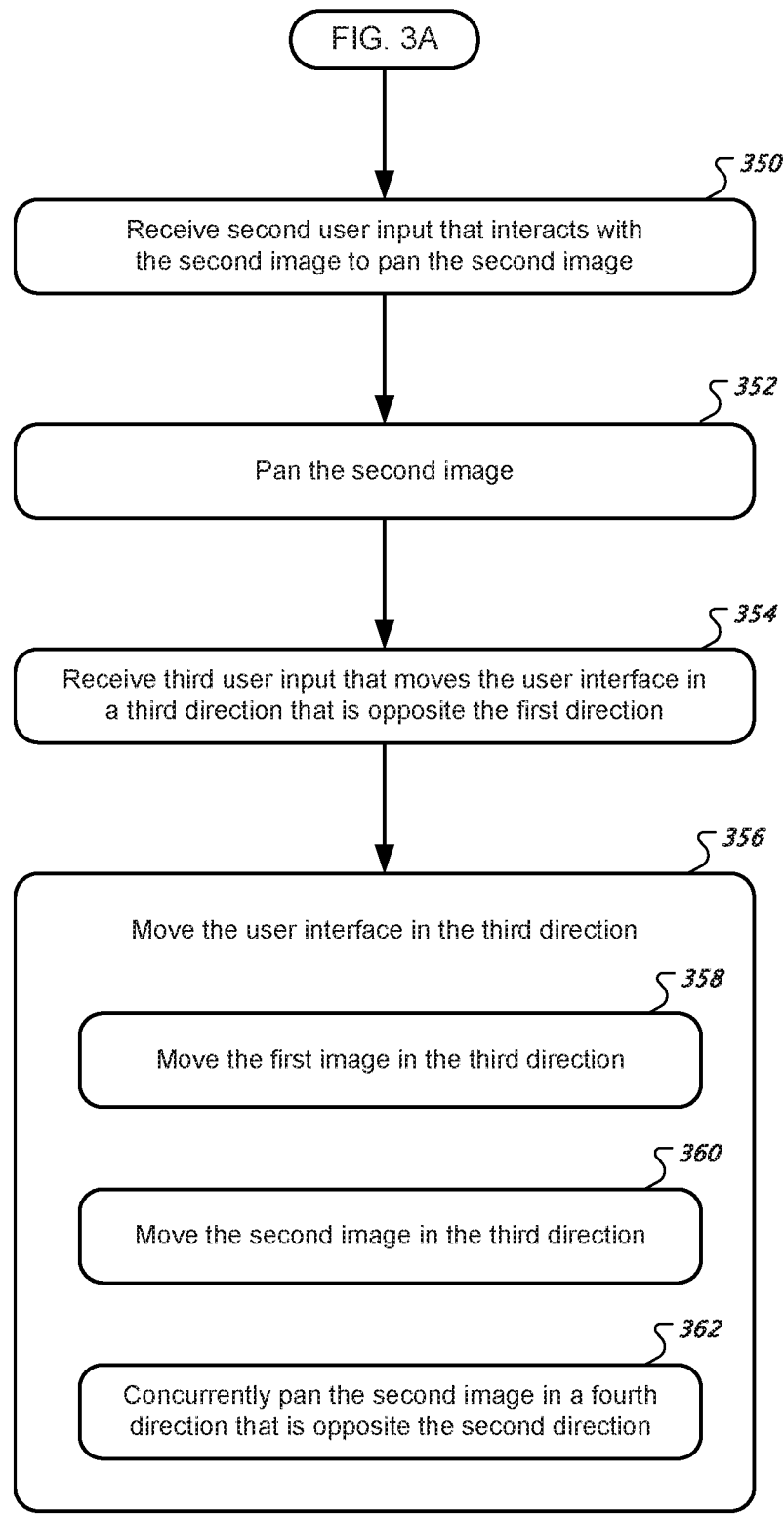

ANIMATING AN IMAGE TO INDICATE THAT THE IMAGE IS PANNABLE

CROSS-REFERENCE TO RELATED APPLICATIONS

This application is a continuation of and claims priority to U.S. application Ser. No. 15/248,530, filed on Aug. 26, 2016, the entire contents of which are hereby incorporated by reference.

TECHNICAL FIELD

This document generally relates to user interface features.

BACKGROUND

Mobile devices have become more capable over the years, with some telephones now including high-resolution cameras and various other sensors, such as gyroscopes and accelerometers. Some mobile devices include software programs that allow a device to capture multiple images using a camera and to stitch the images together to create a larger image, such as a panoramic image or a 360 degree image. Once this larger image is created, a user of the mobile device that created the image or other users to which the image is transmitted may manipulate the image in order to change a portion of the image that is presented at a given moment.

SUMMARY

This document describes techniques, methods, systems, and other mechanisms for animating an image to indicate that the image is pannable.

As additional description to the embodiments described below, the present disclosure describes the following embodiments.

Embodiment 1 is a computer-implemented method for presenting information, the method comprising presenting, by a computing device, a user interface that includes a first image, and a second image. The method comprises receiving, by the computing device, first user input that moves the user interface in a first direction. The method comprises moving, by the computing device and in response to having received the first user input, the user interface in the first direction by: (i) moving the first image in the first direction to correspond to movement of the first user input, (ii) moving the second image in the first direction to correspond to movement of the first user input, and (iii) modifying a presentation of the second image at the same time that the second image is moved in the first direction and in a manner that is different than the movement in the first direction, to indicate that the second image is an image that is pannable. The method comprises receiving, by the computing device, second user input that interacts with the second image to pan the second image. The method comprises panning, by the computing device and in response to having received the second user input, the second image by replacing a first portion of the second image with a second portion of the second image, wherein the first portion of the second image is different from the second portion of the second image.

Embodiment 2 is the method of embodiment 1. Presenting the user interface includes presenting the user interface on a touchscreen of the computing device. Receiving the first user input that moves the user interface in the first direction includes receiving an indication that an object contacted the touchscreen and moved in the first direction.

Embodiment 3 is the method of embodiment 2. The object contacted the touchscreen and moved in the first direction without contacting any portion of the touchscreen at which the second image was being displayed.

Embodiment 4 is the method of embodiment 3. Receiving the second user input that interacts with the second image to pan the second image includes receiving an indication that an object contacted the touchscreen at a location at which the second image was being displayed and moved in a direction other than the first direction. Panning the second image includes panning the second image in the direction that is other than the first direction.

Embodiment 5 is the method of embodiment 1. The first image is a static image that is not pannable. The second image is a panoramic image or spherical image that is pannable.

Embodiment 6 is the method of embodiment 1. Modifying the presentation of the second image includes panning the second image in a second direction.

Embodiment 7 is the method of embodiment 6. The second direction is orthogonal to the first direction.

Embodiment 8 is the method of embodiment 7. The method comprises receiving, by the computing device, third user input that moves the user interface in a third direction that is opposite the first direction. The method comprises moving, by the computing device and in response to having received the third user input, the user interface in the third direction by: (i) moving the first image in the third direction to correspond to movement of the third user input, (ii) moving the second image in the third direction to correspond to movement of the third user input, and (iii) panning a presentation of the second image in a fourth direction that is opposite the second direction at the same time that the second image is moved in the third direction, to indicate that the second image is an image that is pannable.

Embodiment 9 is directed to a one or more computer-readable devices having instructions stored thereon, that when executed by one or more processors, cause the performance of actions according to the method of any one of embodiments 1 through 9.

Particular implementations can, in certain instances, realize one or more of the following advantages. For example, users of a computing device may be able to tell which one or more images in a display are pannable. Animating images that are pannable encourages interaction with the images. When the image pans upon receipt of user input with the device, in order to indicate that the image is pannable, the user may see additional portions of the image and thus may be able to determine whether it is worth the extra effort to interact with the image to pan it in a particular direction. This can save computing resources and bandwidth in displaying and/or downloading an entirety of the image, which may have a higher resolution than an initially-displayed thumbnail of the image.

The details of one or more implementations are set forth in the accompanying drawings and the description below. Other features, objects, and advantages will be apparent from the description and drawings, and from the claims.

DESCRIPTION OF DRAWINGS

FIGS. 3A-B show a flowchart of a process for animating an image to indicate that the image is pannable.

Like reference symbols in the various drawings indicate like elements.

DETAILED DESCRIPTION

This document generally describes animating an image to indicate that the image is pannable. In general, a computing device may present a user interface that a user can move around. For example, if the user interface is presented by a touchscreen, a user may swipe up or down across the touchscreen to move the user interface up or down. An example in which this may occur is when a smartphone is presenting a webpage. The web page may include multiple images, and some of those images may be pannable, which can mean that the presentation of the image may include only a portion of the image, and that the user can interact with the image (e.g., swipe sideways across the image) to view other portions of the image. This can be the case when the image is a panoramic image and the user can swipe left or right on the image to see other portions of the image In such examples, when the user moves the user interface, for example, by swiping the user interface upward, the image that is pannable may move in the direction that the user interface is moving, but can also automatically animate, for example, by panning to the side without user interaction with a region at which the image is displayed. If there are multiple pannable images on the display, the multiple images may pan at the same time while the user is moving the user interface. Static images, such as those images that are not pannable, may also move in the direction that the user is moving the user interface, but may not pan or otherwise animate within the displayed portion of the image as it moves across the display. As such, a user may be able to easily tell which images are pannable, and therefore may be more likely to interact with those images. This can be helpful because sometimes the portion of a pannable image that may be of most interest may not be initially displayed. Thus, the hint animation hint that the image is pannable may be particularly effective and may encourage the user to explore other portions of the image.

Figure 1B:
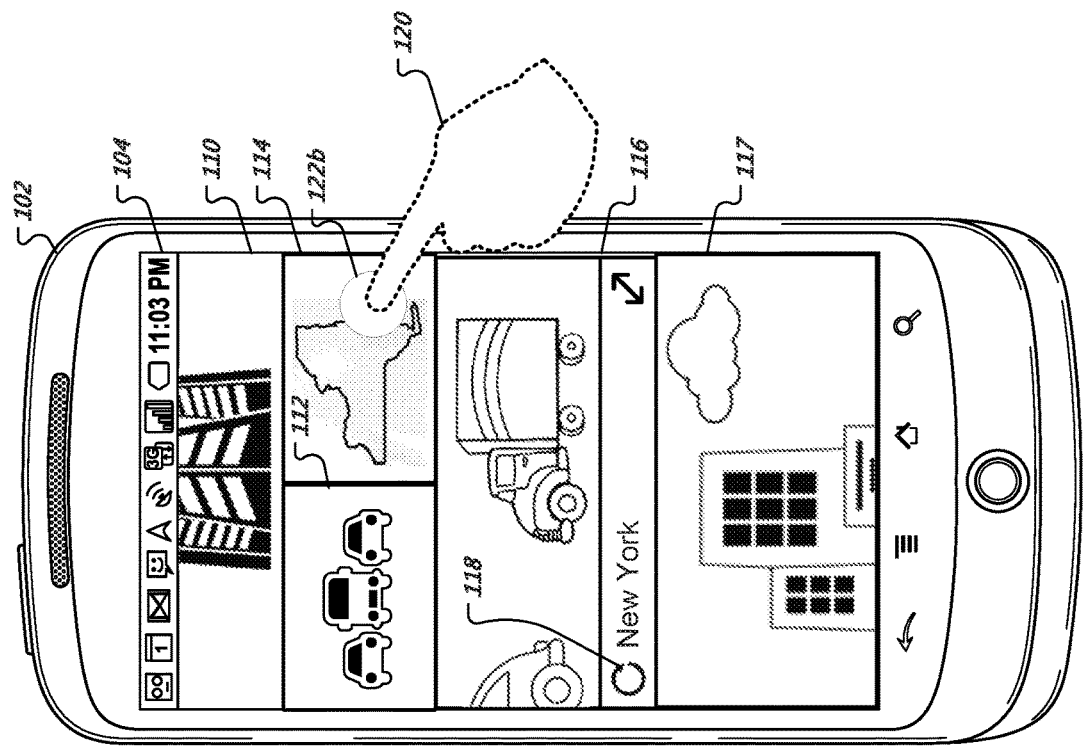
FIGS. 1A-B show user interfaces that, when moved by a user, animate an image to indicate that the image is pannable.
Figure 1A:
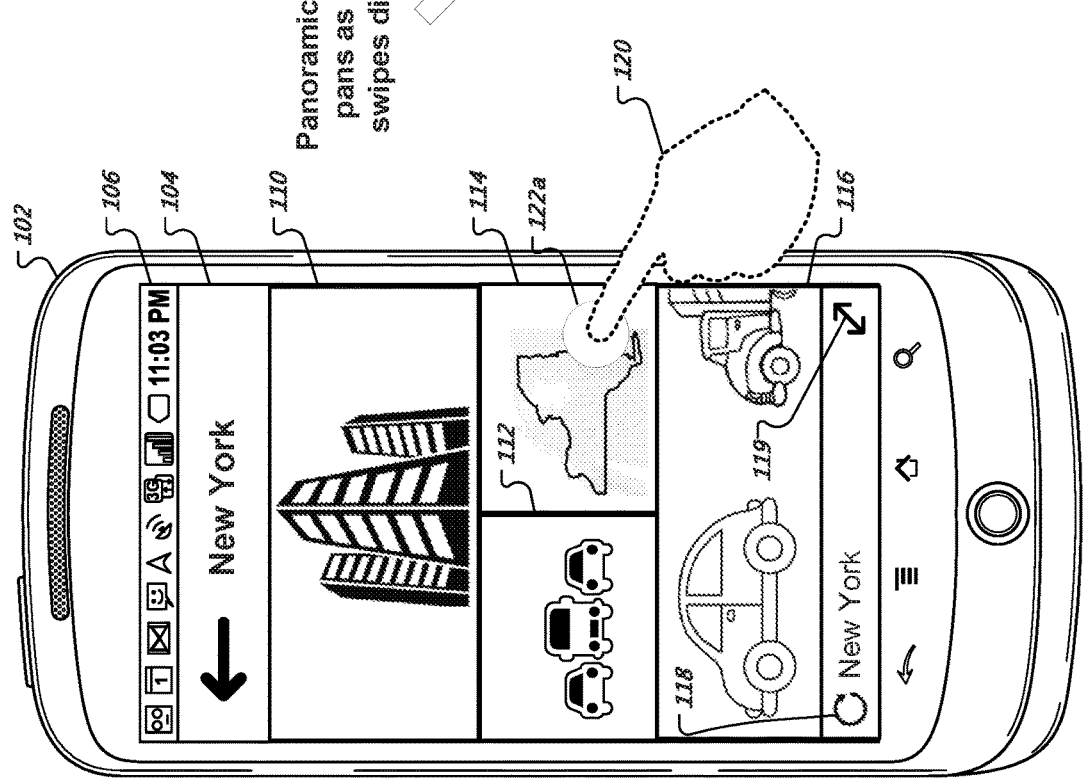
Figure 2A:
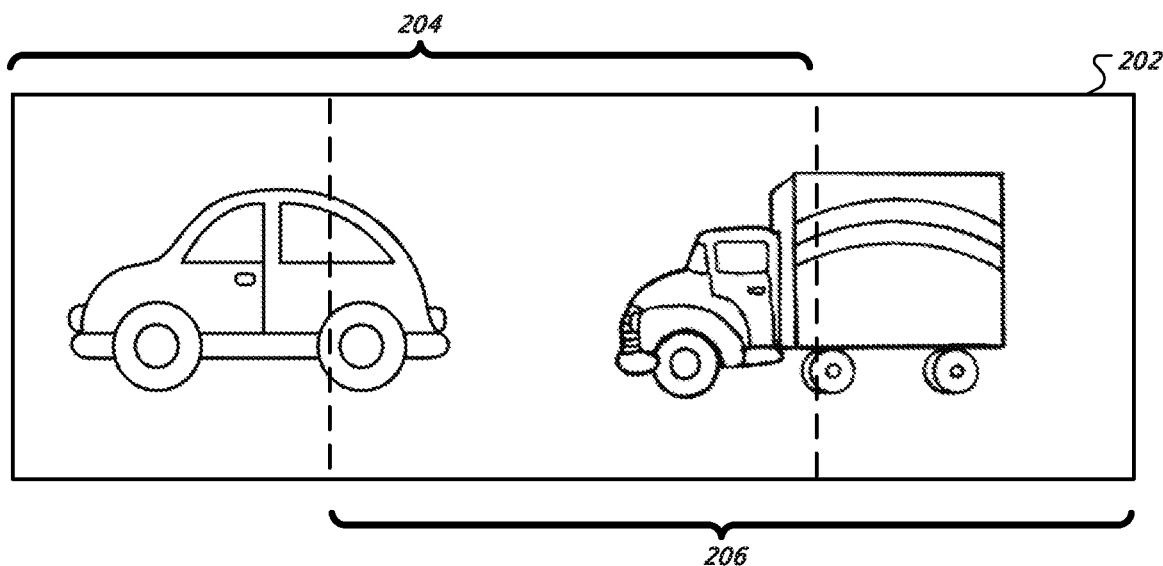
FIGS. 2A-B show a pannable image and different portions of the pannable image that may be presented at a particular time in a user interface.
Figure 2B:
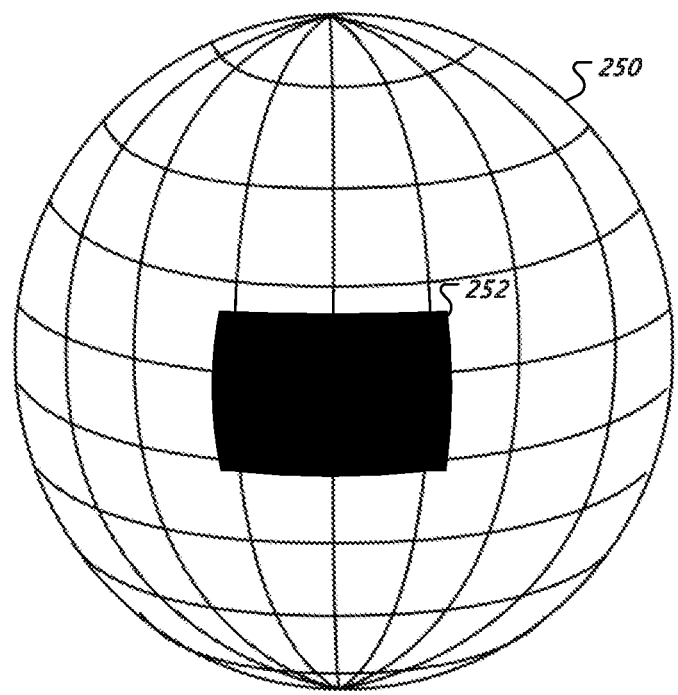
Figure 3A:
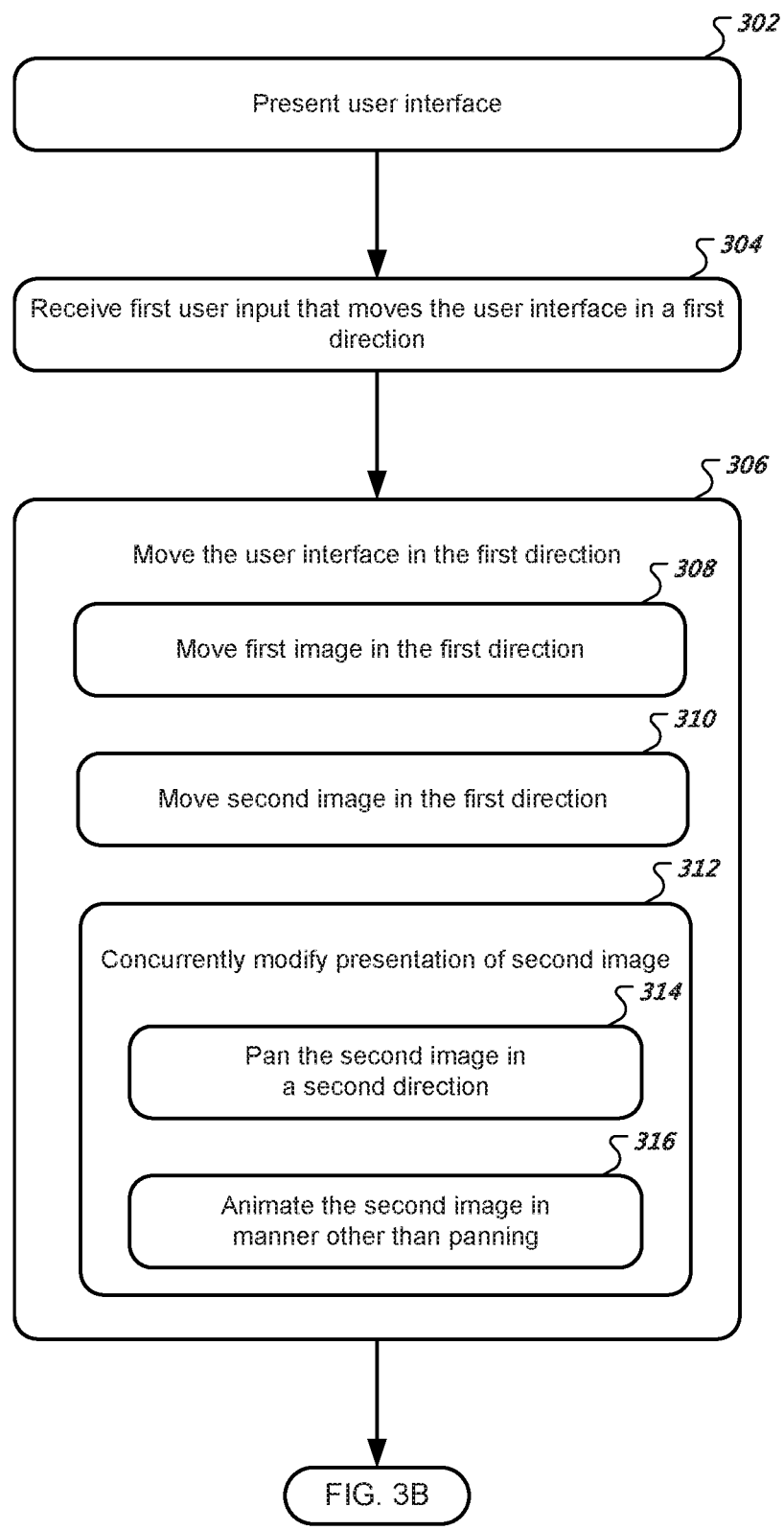

This document describes this process for animating an image to indicate that the image is pannable in greater detail with reference to FIGS. 1A-3, which are discussed below. FIGS. 1A-B show a user moving a user interface by swiping across it, and therefore causing a pannable image within the user interface to automatically pan. FIG. 2 shows a close up of the pannable image, and how the presented region of the image represents a subset of the image. FIGS. 3A-B show a flowchart that shows various actions involved in the process for animating an image. The following description of this process is made with reference to the actions in the flowchart of FIGS. 3A-B, with regular references to FIGS. 1A-B and 2 to graphically illustrate those actions. And finally, the first digit of the item indicators in in the figures identifies the figure to which the item identifier can be found. For example, box 302 refers to an item in FIGS. 3A-B, while computing device 102 refers to an item in FIGS. 1A-B.

At box 302, a computing device presents a user interface. For example, the computing device 102 may present user interface 104. The user interface may include the entirety of elements presented by the display or a sub-portion thereof (e.g., all elements except the status bar 106, which may generally be unmovable). In this example, the user interface 100 shows multiple images for a particular location. For example, a user may have submitted a query to search for a location in a geographic search engine, and upon being presented with one or more responsive results to that query, may select a result to view images that are relevant to that result. In this example, the user searched for "New York" and then selected to view images that are relevant to New York. The user interface and features discussed through this document, however, are not limited to images for geographic search engine results. Rather, the images may appear in various different applications or web pages. In general, various screens of a computing device with which a user may interact may present pannable images that can animate to indicate that those images are pannable.

Returning to the example that is shown in FIG. 1, the user interface in that example includes multiple images 110, 112, 114, 116, and 117. One or more of these images (image 116) may be a panoramic image that is pannable, which is illustrated in this example by icon 118. The meaning of icon 118, however, may not be apparent to all viewers of device 102 and the icon is relatively small in comparison to other user interface features. As such, viewers may not immediately recognize image 16 as being a pannable panoramic image. As discussed below, the pannable image may animate to indicate that the image is pannable (e.g., manipulable by user input).

At box 304, the computing device receives first user input that moves the user interface in a first direction. For example, a user may contact a touchscreen display of the computing device 102 and swipe generally upwards to move the display in the upwards direction. This is illustrated in FIGS. 1A-B by the user input 120 moving from location 122a-122b. The movement may occur without the user input being removed from the display. In other words, the user may drag his finger (or a stylus) across the touchscreen display, before releasing from contact with the display. Although the user input may not be exactly upwards (it may be off by 5 or 10%), the computing device may identify the gesture as being generally upwards and may thus move the user interface in the upwards direction.

Reference to moving the user interface upwards in this document generally refers to moving items of the user interface (e.g., all items) upwards to correspond to movement of the user input (e.g., moving the same distance and generally the same direction as the user input). Such movement may result in some graphical items near the top of the user interface disappearing from the display during the movement upwards and some graphical items being added near the bottom of the display. In this manner, the described user interface refers to the conceptual entirety of the image, only part of which may be displayed at any given time by computing device 102. Moreover, the user interface may not necessarily include all items presented by the screen. For example the status bar 106 may not move with the user interface as the user scrolls. As such, the user interface may be a sub-portion of the displayed content. The user interface may be the portion of the display that is controlled by a particular application program and that receives information from the particular third party application to generate the user interface (e.g., a web browser or third-party application program that is downloaded from an application marketplace).

In various implementations, the user input can include movement of the user interface that is caused by an auxiliary device, such as a wired or wireless mouse or trackpad. The movement may result from user input that interacts generally with a background of the user interface (e.g., not a portion of the above-described first or second image) and that drags the background in the first direction, or that drags a scrollbar to the side of the display in a direction that is opposite the first direction.

In various implementations, the first user input may alternatively include other types of movement or user interaction with the computing device. For example, the trigger for performing various actions that are described below may be movement of the device that is detected by one or more accelerometers or gyroscopes of the device. The trigger may also include simply touching the user interface (e.g., tapping the screen, performing a long press on the screen, or moving the mouse cursor). In some examples, the trigger may include the screen refreshing or loading due to user input, such as when the display changes from presenting a previous user interface to presenting a user interface that includes a pannable image (e.g., as the user navigates to a web page). Based on these types of interaction with the device, the device may perform any of the various actions that are describing in this document (e.g., by animating any pannable images presented by the user interface).

At box 306, the computing device moves the user interface in the first direction. For example, the computing device 102 may move the user interface 104 from the position that is illustrated in FIG. 1A to the position that is shown in FIG. 1B. In this example, that movement is upwards because the user input 120 also been identified as moving upwards (even if the movement was askew by a certain number of degrees). This movement may include moving multiple graphical elements that together comprise the user interface in a same direction. For example, the movement of the interface may include moving image 112 upwards (box 308) and moving a second image 116 upwards (box 310).

The movement of the graphical elements can correspond to the movement of the user input, such that the graphical elements and the user input move in the same direction (e.g., at least a direction determined by the computing device to be a direction of the user input). This can also include the graphical elements and the user input moving a same distance at the same time. The movement can be continuous, such that the displayed portion of the user interface occupies a continuum of locations between the start of the user input 120 and the end of the user input 120.

At box 312, movement of the user interface in the first direction includes concurrently modifying presentation of the second image. This concurrent modification can include various types of animations of the second image. In some examples, this animation includes panning the second image in a second direction (box 314). The second direction can be orthogonal to the first direction. For example, as the user swipes the display upwards, the second image may animate by panning to the left to present a different portion of the second image.

This panning may begin occurring at a time that corresponds to a time at which the user input began and may continue until the user input ends (e.g., the panning may occur as long as the user input is contacting the display or moving). The panning may also correspond to a level of movement of the user input (e.g., the panning may only occur when the user input is moving). As such, the faster the user input moves the faster the panning may occur. The panning can also correspond to movement of the user interface, such that such that the panning occurs only when the user interface is moving, and pans a distance that is the same or proportional to a distance moved of graphical elements in the user interface. Because the user interface may move according to physics modelling that causes the user interface to continue to move and then, after the user releases contact with the display, slow down. The panning can also occur in directions other than orthogonal to the first direction, for example, such as in the first direction, in a direction opposite the first image or in any other angle from 0 to 360 degrees.

This panning of an image is illustrated in greater detail with respect to FIG. 2. Image 202 is a pannable image that can be a representation of image 116 from FIG. 1. Image 202 may be a panoramic image, which means that the image may be particularly wide or have small height when compared to its width. This means that some displays of the image on a device may only be able to present a portion of the image (assuming that the image is scaled so that its height occupies most or all of the height of the display). In this illustration, there are two presentations of the image shown: (i) a first presentation in which a first portion 204 of the image 202 is shown, and (ii) a second presentation in which a second portion 206 of image 202 is shown. These portions are different, although they may have an overlapping region (e.g., that region which is bounded to the sides by the dotted lines in FIG. 2 and that shows the back of the car and the front of the truck).

With respect to presentation of this image as illustrated in FIG. 1, as the user input 120 moves up the display from location 122a to location 122b, the image may pan from presenting portion 204 to presenting portion 206. This panning may occur smoothly, such that a "window" slides across image 202 to present different portions of image 202 (or it could be thought of as the window staying fixed and the image moving behind the window, because the image in FIG. 1 may not move side to side, even though it is moving upward to correspond to movement of the other images).

At box 316, in some implementations, the animation includes animating the second image in a manner other than panning (box 316). For example, as user input interacts with the computing device, the computing device may zoom into the second image or out of the second image. In another example, as user input interacts with the computing device, the computing device may move the displayed portion of the second image so that it appears to vibrate or shake, moving back and forth quickly. In other examples, as user input interacts with the computing device, the second image may animate by adding a graphical element to the image (e.g., an icon or text), or by shading or applying a filter to the image. All in all, any of multiple ways to animate the image or a nearby portion of the user interface to indicate that the second image is of a different type than non-pannable graphical elements, which may be those images and graphical elements that may move across the display in coordination.

In various examples, the user interface 104 may include multiple images that are pannable, and the images may pan at the same time and in the same direction, as user input moves the user interface 104 (e.g., without contacting either of the pannable images). In some examples, the discussed image is any of various types of media files, such as a video. In such situation, moving the user interface can cause the video to play. The video may be a 360 degree video, and the video may not only play, but may rotate as a user pans across the display. The panning may be identified as being user controlled rather than occurring in the video, because the panning may speed up and slow down as the user speeds up and slows down his or her movement of the user interface.

At box 350, second user input interacts with the second image to pan the second image. For example, a user may recognize that the image 116 is a pannable image due to the user seeing animation of the image 116 that occurred as a result of the user's interaction with computing device 102. As a result, the user may want to see other portions of the pannable image or otherwise "discover" other content in the image by controlling a panning of the image. As such the user can interact with computing device 102 to pan the image. The user interaction can include swiping a region of the touchscreen at which image 116 is being displayed, for example, to pan image 116 in a direction of the swipe.

In some examples, instead of swiping over the location of the image 116, the user may control a graphical element that is displayed to the side of the image 116 and that controls which portion of image 116 is presented. In some examples a user may need to first activate panning of the image before swiping over the image to control its display, for example, by tapping or clicking on the image 116 or an activation element 119. As a result of tapping or clicking on the image 116 or the activation element 119, the computing device may increase a displayed size of the image, such that the image occupies a larger region of the display than previously, which provides the user a view of the image in enhanced detail. Once enlarged, the user may pan the image in various directions (e.g., side to side when the image is pannable, or up/down/in/out for a spherical image).

At box 352, the computing device may pan the second image as a result of the user providing the second input. For example, the image 120 may pan in the direction of a user swipe over the image, for example, as described above with respect to box 350. The image 120 may also zoom in and out as a result of user input that is described above with respect to box 350. In various implementations, the panning that occurs as a result of user input that moves the user interface (e.g., as described with respect to box 304 and 306, rather than specifically with a panned image) may set a displayed region of the image 116 that is initially presented after a user interacts with the image to pan the image (as described with respect to boxes 350 and 352). Moreover, user panning of the second image (as described with respect to boxes 350 and 352) may include modifying only a display of the second image, even though other pannable images may be presented by the user interface 106 at the same time. In other words, although multiple pannable images may pan when the user swipes the entire user interface in a particular direction, but once a user selects to pan a specific pannable image, only that image may pan. Further the user panning of the second image (as described with respect to boxes 350 and 352) may occur while the user interface 104 (including the first and second images) is stationary.

In those circumstances in which a user pans to the edge of an image, the computing device 102 may stop the panning action, pan back the other way, or jump to the other side and continue panning in the same direction. Still, the pannable image may be a 360 degree image that represents a complete 360 degree view around a user, captured for example, by stitching together multiple images as a user rotated his or her camera around him, or that was captured using a special 360 degree camera. In such circumstances, the panning may continue as there may be no edge of the image.

At box 354, the computing device receives a third user input that moves the user interface in a third direction that is opposite the first direction. For example, if the user had previously scrolled the user interface upward as shown in FIG. 1 (which causes more content from the bottom of the user interface to display), the user may now scroll the user interface downward by swiping downward.

At box 356, the computing device may move the user interface in the third direction. This action may be in response to the computing device having received the third user input, and may occur concurrently with receipt of the third user input. For example, the computing device may move a region at which the first image is displayed downward (box 358), and may also move a region at which the second image is displayed downward (box 360). In such an example, the second image may concurrently pan in a fourth direction that is opposite the second direction. For example, if the image had automatically panned to the left before, it may now pan to the right as the user pans down. In other words, the panning may occur in a different direction than before. The panning may start and stop at the same time that the movement of the user interface starts and stops. In implementations in which the animation is an event other than panning, the image may zoom a different direction, the shading of the image may reverse, or an icon added to the second image may disappear from the second image.

The above discussion explains that pannable images can include panoramic and 360 degree images, but similar animations can occur with spherical images, which may be similar to panoramic and 360 degree images. A spherical image, however, may include not just the regions to the sides of a user, but also those regions above and/or below the user. For example, and with reference to FIG. 2B, an image may define all or at least some portions of a surface of a spherical body 250, such that panning—viewed from the center of the spherical body 250—causes the computing device to show different portions of the image that covers the spherical body 250. In the illustration that is presented in FIG. 2B, the portion 252 of an image that covers the entire surface of spherical body 250 may currently be displayed by a computing device, and as the user pans the image (e.g., by moving a user interface or providing input to pan only the image but not the user interface), the displayed portion of the image may similarly pan, for example, to show a portion of the image at the top of the spherical body 250 or down and to the side of the spherical body 250.

Figure 4:
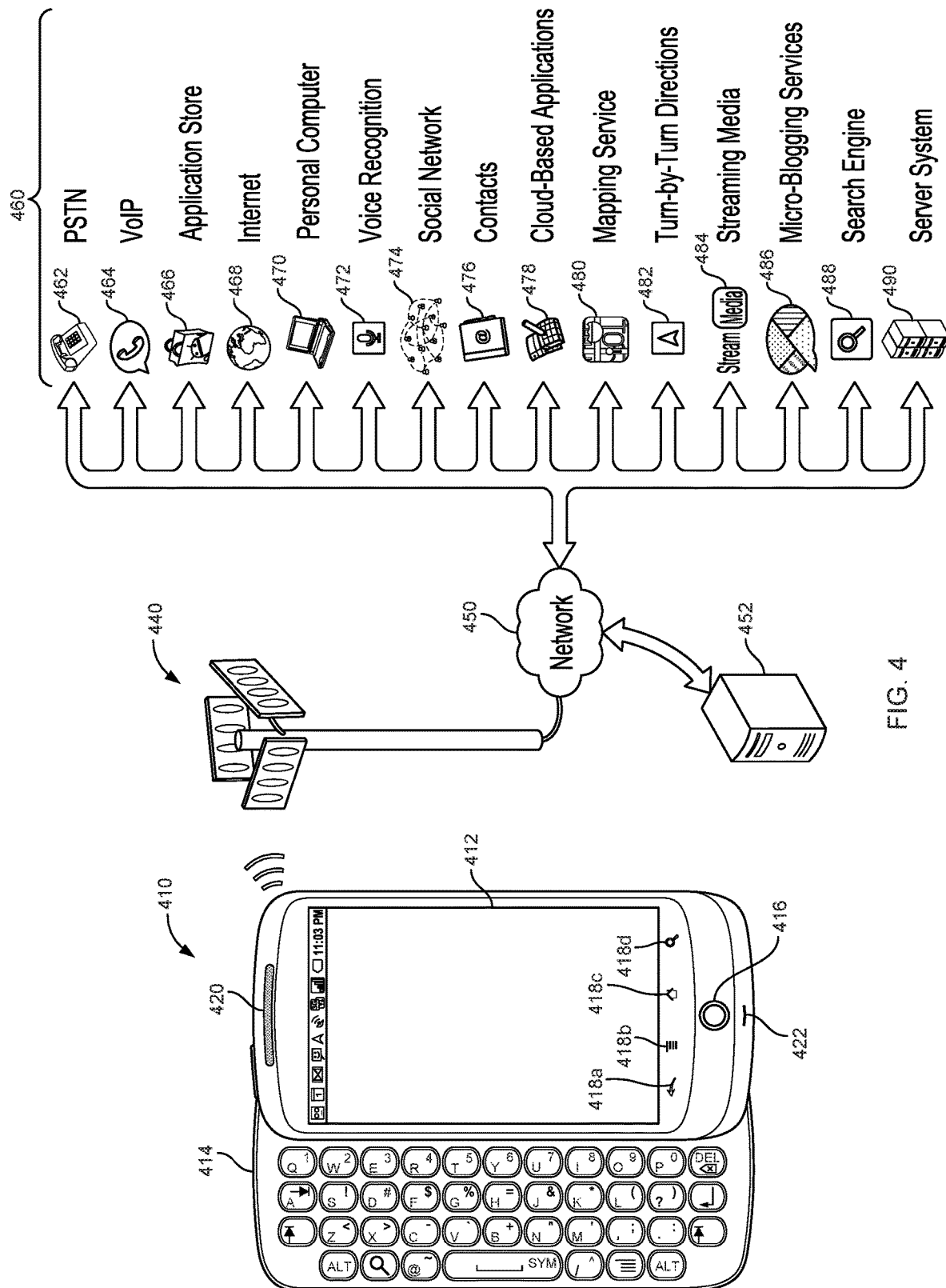
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
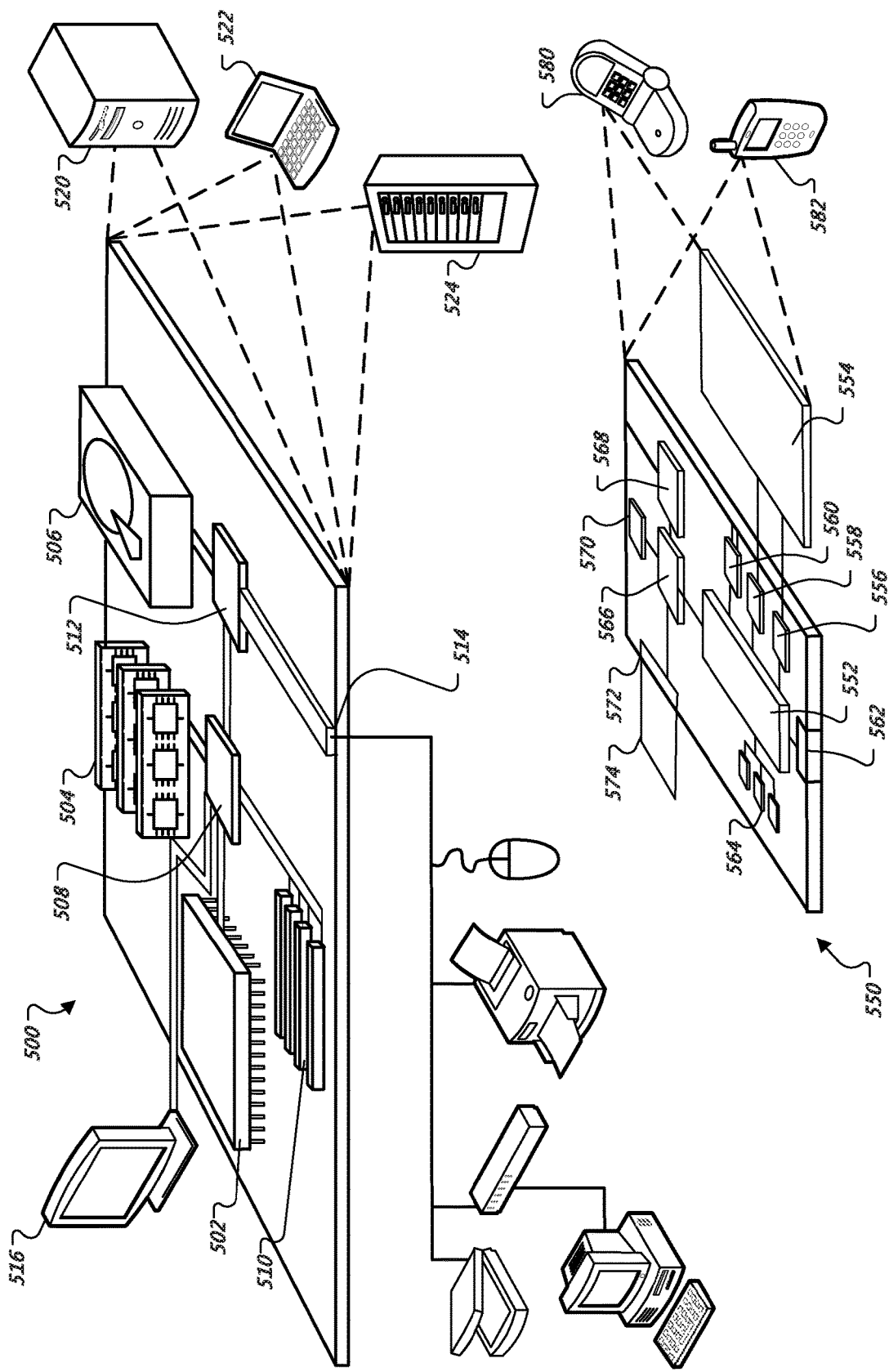
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for presenting information, comprising:
   presenting, by a computing device, a user interface that includes a static image that is not pannable, and a pannable image that is pannable;
   receiving, by the computing device, first user input that moves the user interface upward;
   moving, by the computing device and in response to having received the first user input, the user interface upward by:
      (i) moving the static image upward to correspond to movement of the first user input,
      (ii) moving the pannable image upward to correspond to movement of the first user input, and
      (iii) animating a presentation of the pannable image in a first manner, while the pannable image is moved upward and due to the first user input moving the user interface upward, to indicate that the pannable image is an image that is pannable;
   receiving, by the computing device, second user input that moves the user interface downward;
   moving, by the computing device and in response to having received the second user input, the user interface downward by:
      (i) moving the static image downward to correspond to movement of the second user input,
      (ii) moving the pannable image downward to correspond to movement of the second user input, and
      (iii) animating the presentation of the pannable image in a second manner, while the pannable image is moved downward and due to the second user input moving the user interface downward, to indicate that the pannable image is an image that is pannable, the animating of the presentation of the pannable image in the second manner being a reversing of the animating of the presentation of the pannable image in the first manner;
   receiving, by the computing device, third user input that interacts with the pannable image to pan the pannable image; and
   panning, by the computing device and in response to having received the third user input, the pannable image by replacing a first portion of the pannable image with a second portion of the pannable image, wherein the first portion of the pannable image is different from the second portion of the pannable image.

2. The computer-implemented method of claim 1, wherein:
   presenting the user interface includes presenting the user interface on a touchscreen display device; and
   receiving the first user input that moves the user interface upward includes receiving an indication that an object contacted the touchscreen and moved upward across the touchscreen display device.

3. The computer-implemented method of claim 2, wherein the object contacted the touchscreen and moved upward across the touchscreen without contacting any portion of the touchscreen at which the pannable image was displayed.

4. The computer-implemented method of claim 3, wherein:
   receiving the third user input that interacts with the pannable image to pan the pannable image includes receiving an indication that an object contacted the touchscreen at a location at which the pannable image was displayed and moved in a first direction; and
   panning the pannable image includes panning the pannable image in the first direction.

5. The computer-implemented method of claim 1, wherein the pannable image is a panoramic image or a spherical image.

6. The computer-implemented method of claim 1, wherein the animating the presentation of the pannable image in the first manner and the animating the presentation of the pannable image in the second manner does not represent playing of a video.

7. The computer-implemented method of claim 1, wherein:
   the animating the presentation of the pannable image in the first manner while the pannable image is moved upward and due to the first user input moving the user interface upward includes a first option selected from a group consisting of zooming into the pannable image and zooming out of the pannable image; and
   the animating the presentation of the pannable image in the second manner while the pannable image is moved downward and due to the second user input moving the user interface downward includes a second option selected from the group consisting of zooming into the pannable image and zooming out of the pannable image, the second option being different from the first option.

8. The computer-implemented method of claim 1, wherein:
the animating the presentation of the pannable image in the first manner while the pannable image is moved upward and due to the first user input moving the user interface upward includes a first option selected from a group consisting of adding a graphical element to the pannable image and removing the graphical element from the pannable image; and
the animating the presentation of the pannable image in the second manner while the pannable image is moved downward and due to the second user input moving the user interface downward includes a second option from the group consisting of adding the graphical element to the pannable image and removing the graphical element from the pannable image, the second option being different from the first option.

9. The computer-implemented method of claim 1, wherein:
the animating the presentation of the pannable image in the first manner while the pannable image is moved upward and due to the first user input moving the user interface upward includes a first option selected from a group consisting of applying a filter to the pannable image and removing application of the filter to the pannable image; and
the animating the presentation of the pannable image in the second manner while the pannable image is moved downward and due to the second user input moving the user interface downward includes a second option selected from the group consisting of applying the filter to the pannable image and removing application of the filter to the pannable image, the second option being different from the first option.

10. The computer-implemented method of claim 1, wherein:
the animating the presentation of the pannable image in the first manner includes animating the presentation of the pannable image in a manner that is proportional to a distance of the movement of the user interface upward; and
the animating the presentation of the pannable image in the second manner includes animating the presentation of the pannable image in a manner that is proportional to a distance of the movement of the user interface downward.

11. The computer-implemented method of claim 1, wherein:
the animating the presentation of the pannable image in the first manner includes animating the presentation of the pannable image at a speed at which the user interface moves upward, such that the animating speeds up and speeds down as the movement of the user interface speeds up and speeds down; and
the animating the presentation of the pannable image in the second manner includes animating the presentation of the pannable image at a speed at which the user interface moves downward, such that the animating speeds up and speeds down as the movement of the user interface speeds up and speeds down.

12. The computer-implemented method of claim 1, wherein the computing device is configured to start animating the user interface at a same time that the user interface starts moving and stop animating the user interface at a same time that the user interface stops moving.

13. A computerized system, including:
one or more computer processors; and
one or more computer-readable devices including instructions that, when executed by the one or more processors, cause the one processors to perform operations that include:
presenting, by a computing device, a user interface that includes a static image that is not pannable, and a pannable image that is pannable;
receiving, by the computing device, first user input that moves the user interface upward;
moving, by the computing device and in response to having received the first user input, the user interface upward by:
(i) moving the static image upward to correspond to movement of the first user input,
(ii) moving the pannable image upward to correspond to movement of the first user input, and
(iii) animating a presentation of the pannable image in a first manner, while the pannable image is moved upward and due to the first user input moving the user interface upward, to indicate that the pannable image is an image that is pannable;
receiving, by the computing device, second user input that moves the user interface downward;
moving, by the computing device and in response to having received the second user input, the user interface downward by:
(i) moving the static image downward to correspond to movement of the second user input,
(ii) moving the pannable image downward to correspond to movement of the second user input, and
(iii) animating the presentation of the pannable image in a second manner, while the pannable image is moved downward and due to the second user input moving the user interface downward, to indicate that the pannable image is an image that is pannable, the animating of the presentation of the pannable image in the second manner being a reversing of the animating of the presentation of the pannable image in the first manner;
receiving, by the computing device, third user input that interacts with the pannable image to pan the pannable image; and
panning, by the computing device and in response to having received the third user input, the pannable image by replacing a first portion of the pannable image with a second portion of the pannable image, wherein the first portion of the pannable image is different from the second portion of the pannable image.

* * * * *